(12) United States Patent
Thompson et al.

(10) Patent No.: US 7,211,208 B2
(45) Date of Patent: May 1, 2007

(54) CARBON BRAKE DISK HAVING NONCARBONIC MATERIAL THEREIN AND METHOD FOR MAKING SAME

(75) Inventors: William D. Thompson, Canton, OH (US); David R. Snyder, Cuyahoga Falls, OH (US); Robert T. Webb, Akron, OH (US)

(73) Assignee: Aircraft Braking Systems Corporation, Akron, OH (US)

( * ) Notice: Subject to any disclaimer, the term of this patent is extended or adjusted under 35 U.S.C. 154(b) by 388 days.

(21) Appl. No.: 10/757,003

(22) Filed: Jan. 13, 2004

(65) Prior Publication Data

US 2005/0153137 A1    Jul. 14, 2005

(51) Int. Cl.
*B29C 43/02* (2006.01)

(52) U.S. Cl. .................. 264/81; 264/122; 264/128
(58) Field of Classification Search .............. None
See application file for complete search history.

(56) References Cited

U.S. PATENT DOCUMENTS

| 5,686,117 | A | * | 11/1997 | Snyder et al. | ............... 425/112 |
| 5,962,135 | A | * | 10/1999 | Walker et al. | ............... 428/408 |
| 6,083,436 | A | * | 7/2000 | Thompson et al. | ........... 264/81 |
| 6,376,431 | B1 | * | 4/2002 | Matsumoto et al. | ........ 508/107 |

* cited by examiner

*Primary Examiner*—Mary Lynn Theisen
(74) *Attorney, Agent, or Firm*—Renner, Kenner, Greive, Bobak, Taylor & Weber

(57) ABSTRACT

A method and apparatus for making carbon/carbon composite disks for braking applications that employs a continuous feeding of fiber strands into a mold. The fibers are then compressed to form a mat or preform. The fibers are then needled such that the fibers within the mat interlock and extend in various directions. The mat or preform is then subjected to densification processing. In order to enhance the effectiveness of the densification process and/or to speed up the processing time, a filler is added to the preform during the manufacturing process. The fillers are added by way of a dry powder or as a liquid slurry. The filler may be aluminum oxide, boron carbide, silicon carbide, pitch, or a variety of carbonic or noncarbonic performance enhancers.

7 Claims, 1 Drawing Sheet

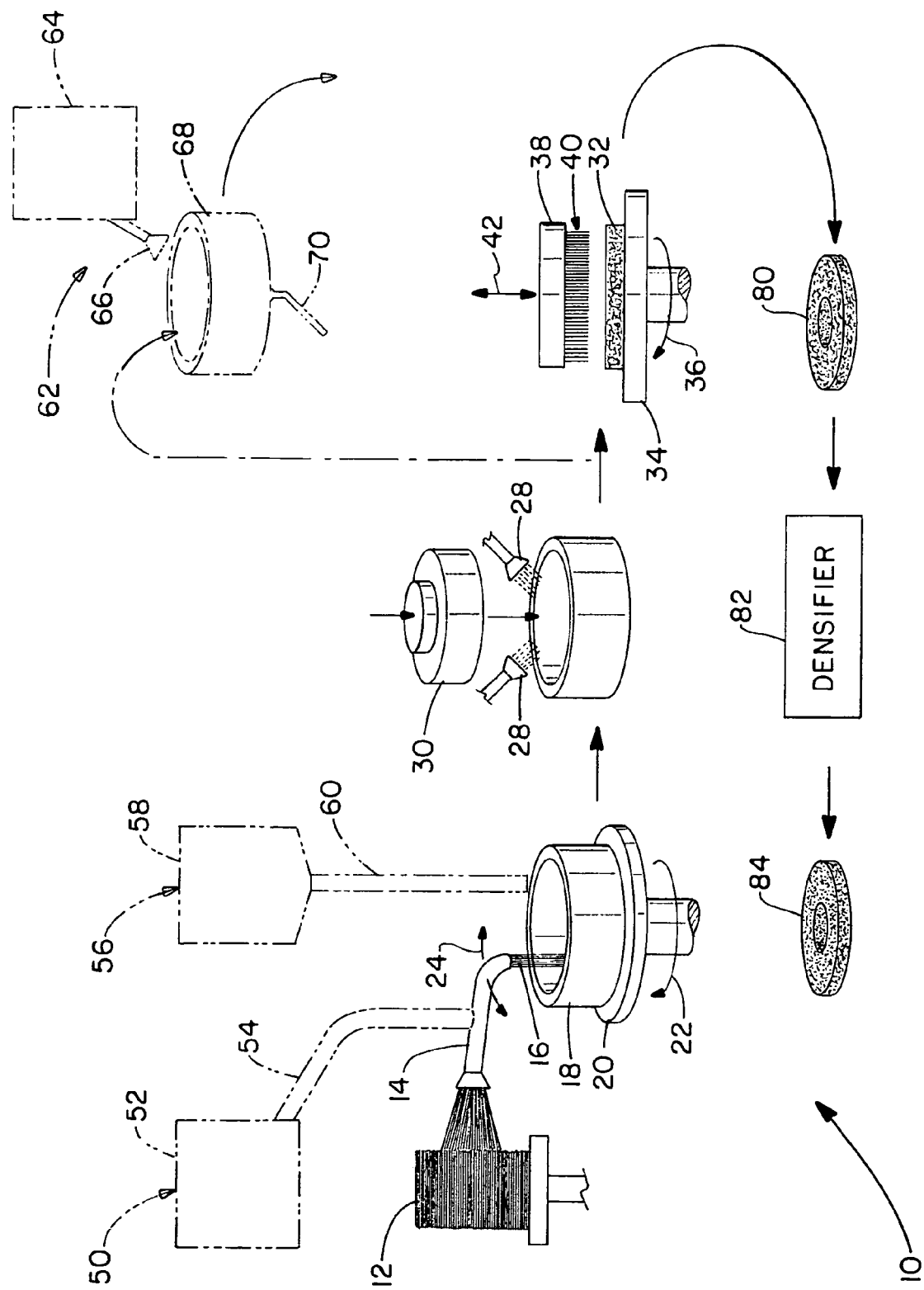

CARBON BRAKE DISK HAVING NONCARBONIC MATERIAL THEREIN AND METHOD FOR MAKING SAME

TECHNICAL FIELD

The invention herein resides in the art of braking systems and, more particularly, to carbon brake disks employed in the brake disk stacks thereof. More particularly, the invention relates to a method and apparatus for manufacturing carbon/carbon composite brake disks. Specifically, the invention relates to the manufacture of carbon/carbon composite brake disks from either precarbonized or carbonized PAN, pitch, or a combination of PAN and pitch fibers. Moreover, the invention relates to carbon/carbon composite brake disks made with fillers that enhance performance and reduce the time required for manufacture.

BACKGROUND ART

The use of carbon fiber/carbon matrix composite disk brakes, commonly referred to as carbon/carbon composite disk brakes in the braking industry is extensively known. Thermal characteristics and the braking efficiency of such braking systems account for their wide spread acceptance in such industries as the aircraft industry. However, those skilled in the art realize that carbon/carbon composite brakes are expensive, a large portion of the costs incident thereto being the labor intensity required in the manufacture of the carbon/carbon composite disks themselves. Carbon/carbon composite brake disks are formed of fibers which are provided in the form of a tow (bundle of continuous filament) or in a roving (a bundle of many short filaments). These fibers may be derived from either pitch or PAN. Those skilled in the art readily understand that pitch fiber is one in which a thermoplastic derivative of coal tar or petroleum pitch is spun into fiber which is subsequently carbonized by an appropriate technique or method for driving the volatiles therefrom. Poly acryl nitrile fibers, commonly referred to as PAN fibers, are oxidized, carbonized, and appropriately heat treated. Both pitch and PAN fibers are well known and extensively used in the manufacture of carbon/carbon composite disks for braking systems.

The state of the art for the manufacture of carbon/carbon composite disks for the braking industry is fairly shown in U.S. Pat. Nos. 5,686,117 and 6,083,436. There, effective methods and apparatus for forming such carbon/carbon composite disks are shown. However, the techniques of certain of the prior art are time-consuming and the resultant structures often exhibit less than optimum performance.

An important step in the manufacture of carbon/carbon brake disks is densification of the disk by introducing carbon material into the gaps, openings and crevices that characterize the interwoven array of carbon fibers of the tow or roving forming the disk. Such is typically achieved by chemical vapor infiltration (CVI), a time-consuming process. In accordance with the invention, CVI densification time may be reduced by modifying the shape and size of such gaps, openings and crevices and thereby increasing the surface areas therein to which carbon material may bind during CVI or other densification process.

It has been found that disk rubbing surfaces other than of a homogeneous carbon/carbon material may give rise to improved performance as to braking efficiency, thermal dissipation, and wear. In that regard, additives to the tow or roving forming the disk may be employed to achieve such beneficial results. Such additives should, most desirably, be tolerant of high temperatures, and should create desirable performance characteristics.

It has further been found that homogeneous carbon/carbon disks are given to vibrations. According to the invention herein, such vibrations may be dampened or substantially eliminated by interposing an appropriate filler as a center layer.

There is a need in the art for carbon/carbon brake disks manufactured with the use of fillers that hasten the manufacturing process, enhance performance, and substantially dampen vibrations.

DISCLOSURE OF INVENTION

In light of the foregoing, it is a first aspect of the invention to provide a carbon brake disk having carbonic and/or noncarbonic material therein and a method for making such a disk.

Another aspect of the invention is the provision of a carbon brake disk manufactured with a filler to hasten the densification process during manufacture.

Yet another aspect of the invention is the provision of a carbon brake disk in which fillers are employed to modify the shape and size of gaps, openings and crevices within a disk preform during manufacture and to increase the surface area therein to which carbon material may bind during chemical vapor infiltration or other densification process.

Still a further aspect of the invention is the provision of a carbon brake disk having rubbing surfaces other than of a homogeneous carbon/carbon material.

Still a further aspect of the invention is the provision of a carbon brake disk having fillers interposed therein which are tolerant of high temperatures, and have desirable performance characteristics.

Yet another aspect of the invention is the provision of a carbon brake disk having a central carbonic and/or noncarbonic layer conducive to dampening vibrations.

Still another aspect of the invention is the provision of a method of manufacturing a carbon disk as presented above.

The foregoing and other aspects of the invention which become apparent as the detailed description proceeds are achieved by a method for making carbon/carbon composite disks for brakes, comprising the steps of: feeding carbon fibers into a mold; compressing said fibers in the mold to form a compressed mat; densifying said compressed mat by a densification process such as chemical vapor infiltration; and further comprising the step of introducing a carbonic or noncarbonic additive among said carbon fibers forming said compressed mat.

Further aspects of the invention which will become apparent herein are achieved by a carbon/carbon composite disk for brakes, comprising: a multitude of carbon fibers formed in a compressed mat and having interposed thereamong particulate additives taken from the group of aluminum oxide, silicon carbide and boron carbide or other performance enhancers.

DESCRIPTION OF THE DRAWINGS

For a complete understanding of the objects, techniques and structure of the invention, reference should be made to the following detailed description and accompanying drawing wherein there is shown a flow chart of the process of the invention and the resultant disk.

BEST MODE FOR CARRYING OUT THE INVENTION

Referring now to the drawing, it can be seen that a system for making carbon/carbon composite disks in accordance with the invention is designated generally by the numeral 10. The system 10 includes a spool of fiber 12 which, in accordance with the invention, may be either precarbonized or carbonized PAN, pitch, or a combination of PAN and pitch fibers. The fibers of the spool 12 are fed through a feeder tube 14 such that fiber strands 16 are deposited within an annular mold 18 received upon a table or rotating carousel 20. While it is preferred that the fiber strands be continuously fed from the spool 12 and through the feeder tube 14, the invention also contemplates that the strands may be chopped or cut while fed, or chopped or cut prior to feeding, such that varied lengths of fiber strands may be introduced into the mold 18, rather than continuous strands. Various types of relative motion between the feeder tube 14 and mold 18 may be employed. For instance, the carousel 20 may rotate in the direction of the arrow 22, while the feeder tube 14 is caused to reciprocate in a back and forth motion in the direction of the arrows 24. The concurrent rotation of the annular mold 18 with the reciprocation of the feeding tube 24 results in a nutation of the fiber strands 16 as they are deposited into the mold 18, such that the strands are laid into the mold randomly. In other words, randomized fibers are deposited within the cavity defined by the annular mold 18. These randomized fibers align in a generally radial/circumferential plane, such that the fiber strands are found within the mold 18 in stratified layers. There is little, if any, placement of the fiber strands in an axial direction within the mold 18. Of course, this random arrangement of fibers may also be attained solely by movement of the feeder tube 14 over a stationary mold 18, or other suitable arrangement as desired.

The drawing shows, in phantom, various structures and techniques for introducing additives to the disk during manufacture. While a wide variety of additives may be employed, it is preferred that the additives be introduced in the form of a dry powder, or as a particulate within a liquid slurry. The additives are carbonic materials and/or other performance enhancers such as silica, aluminum or boron, but may also include a pitch material. As will be discussed below, during processing the pitch is carbonized and the silica, aluminum and boron are converted to respective ceramics of silicon carbide, aluminum oxide, and boron carbide, having desirable properties for use in a brake. The invention also contemplates the direct introduction of the carbides, oxides or other performance enhancers, into the disk as powders during manufacture.

In order to optimize the likely infiltration of the fillers into the gaps, crevices and openings among the carbon fibers, the particle size of the fillers is limited. In the case of dry powders, the particle size is preferably 800 microns or less, while the particles used in a liquid slurry are generally on the order of only 50 microns or less. While the liquid of the slurry may be of various sorts, water is preferred.

With reference again to the drawing, a first structure and technique for introducing filler into the manufacture of the disk preform may be seen as designated generally by the numeral 50. There, a source 52 of dry powder filler, as above, communicates through a conduit 54 and is intermixed with carbon fibers 12 within the feeder tube 14. The source 52 is preferably a controlled source, as by the size of an outlet aperture, feed control or the like, to regulate the timing, quantities and rates at which the powder is dispersed.

The conduit 54, by interacting and feeding into the feeder tube 14, allows the filler powder to intermix with the carbon fibers 12 with the feeder tube 14. This optimizes the penetration of the dry powders into the carbon fiber bundles. Accordingly, the densification process is both enhanced and expedited.

Another structure and technique for introducing dry powder filler to the preform as it is made is designated by the numeral 56. Here, a controlled source 58 of dry powder filler is fed through a conduit 60 and upon the carbon fiber within the mold 18. Again, the timing, quantity and feed rates of the powder filler may be controlled as with the source 52. The conduit 60 may also be caused to reciprocate or otherwise move to assume uniform depositing of the powder.

In accordance with the preferred embodiment of the invention, control is maintained, as by the source 50 or the source 56, of the amount of powder received by the mold 18, and its placement within the mold. Accordingly, the amount and placement of filler within the disk preform, and ultimately within the disk itself, may be controlled. It is contemplated that, for purposes of wear and performance, the filler may be uniformly distributed throughout the disk, both axially and radially, during preform build-up. It is also contemplated that the filler may only be deposited within an axially disposed central layer to dampen vibrating in the finished disk.

Those skilled in the art will appreciate that the fiber strands 16 are fed continuously into the mold 18 until a sufficient mass or volume is received therein. At that time, the feeding of the strands 16 and powder filler as by 52, 56 is terminated. The continuous strands 16 are cut at the end of the feeder tube 14, and the annular mold 18 is removed for further processing. As shown, mold 18 is next placed beneath spray heads 28, through which a fugitive binder such as water is sprayed onto the array of stratified layers of fibers and associated fillers. The fugitive binder or water serves as a sacrificial binder and a lubricant for the fibers for further processing. While it is contemplated that a binder and/or lubricant other than water may be employed, it is generally preferred that the binder be sacrificial, by which it is meant that the binder evaporates or is otherwise removed from the fibers during the further processing. With the fugitive binder or water introduced onto the fibers in the mold 18, an annular press 30 is brought into contacting engagement with the fibers within the mold 18 to compress the same into a wet compressed mat or preform of such fibers 32.

An alternative method for imparting filler to the preform may now be undertaken. Instead of, or in addition to, either of the filler suppliers 52, 56, the filler system 62 may be employed. Here, a slurry supply 64, maintaining filler in liquid suspension, communicates through a spray head 66 to a bath receptacle 68, having an associated drain conduit 70. The mat or preform 32 is placed in the receptacle 68 where it is subjected to a liquid slurry of filler of the type discussed above. The slurry is passed from the controlled source 64, through the spray head 66 and into the receptacle 68. The slurry penetrates the openings, gaps and crevices among the fibers of the preform 32, with many of the small filler particles attaching to the fibers as the slurry passes therethrough and the remainder exits the drain 70.

It will be appreciated that the system 62 results in a generally uniform dispersion of filler throughout the preform, resulting in a rather homogeneous structure.

If the system 62 is employed, the filled preform 32 is then placed upon the carousel or rotating plate 34, rotating in the direction of the arrow 36. If the system 62 is not employed, the preform 32 is transported directly from the press 30 to the carousel 34.

The carousel 34 is positioned beneath a reciprocating needle board 38, from which extend a plurality of barbed needles such as felting needles 40. The needle board 38 and associated needles 40 are caused to reciprocate in the direction of the arrow 42. The reciprocating action drives the needles 40 into and out of the mat or preform 32 on each reciprocating action. In the preferred embodiment of the invention, the stroke of the needle board 38 is sufficient that each of the needles 40 pierces the mat or preform 32 and then is completely removed therefrom on the return stroke. It is preferred that the needling technique and apparatus be as provided in U.S. Pat. No. 6,083,436.

As a consequence of the needling operation, there is a resulting needled mat or preform 80 formed interlockingly by radially, circumferentially, and axially oriented fibers within the mat or preform itself. The fibers have filler particles attached thereto, diminishing the openings, gaps and crevices among the fibers. In effect, the filled fibers have assumed a three dimensional characteristic within the mat or preform. Accordingly, it is desired that the needling of the mat or preform 32 continue sufficiently to assure that the needled mat or preform 80 includes filled fibers that are radially, circumferentially, and axially oriented, and that the mat is of a desired final thickness.

The needled mat or preform 80 is then passed to a densifier 82, where it undergoes a densification process such as, but not limited to, chemical vapor infiltration whereby carbon is deposited on the surface of the fibers, within all the voids of the mat or preform 80, to form a substantially solid filled-carbon mass defining the densified disk 84, substantially absent of voids and the like. The filled nature of the preform 80 enhances the efficiency of the densification process by providing increased surface area for carbon attachment, by modifying the shape and size of the openings and gaps to be filled. At the end of the densification processes, the densified disk 84 is removed from the densifier 82 and machined such that the disk can then be used for its designed application. During the thermal processing, any silica or boron powders in the disk are converted to corresponding ceramics of silicon carbide and boron carbide.

Thus it can be seen that the objects of the invention have been satisfied by the structure and process presented above. While in accordance with the patent statutes only the best mode and preferred embodiment of the invention is presented and described in detail, the invention is not limited thereto or thereby. Accordingly, for an appreciation of the true scope and breadth of the invention reference should be made to the following claims.

What is claimed is:

1. A method for making carbon/carbon composite disks for brakes, comprising the steps of:
    feeding carbon fibers into a mold;
    compressing said fibers in the mold to form a compressed mat;
    densifying said compressed mat by chemical vapor infiltration; and
    further comprising the step of introducing an additive among said carbon fibers forming said compressed mat by dusting a powder of said additive upon said carbon fibers prior to their being fed into said mold.

2. The method for making carbon/carbon composite disks according to claim 1, wherein said powder is taken from the group of aluminum, silica and boron.

3. The method for making carbon/carbon composite disks according to claim 2, further comprising the step of heat curing said compressed mat, said curing transforming said aluminum, silica and boron into aluminum oxide, silicon carbide and boron carbide.

4. A method for making carbon/carbon composite disks for brakes, comprising the steps of:
    feeding carbon fibers into a mold;
    compressing said fibers in the mold to form a compressed mat;
    densifying said compressed mat by chemical vapor infiltration; and
    further comprising the step of introducing an additive among said carbon fibers forming said compressed mat by dusting a powder of said additive into said mold and upon said carbon fibers therein.

5. The method of making carbon/carbon composite disks according to claim 4, wherein said additive is introduced into said mold at about the midpoint of said step of feeding carbon fibers into said mold, defining a layer of said additive within said compressed mat.

6. The method for making carbon/carbon composite disks according to claim 5, wherein powder additive is taken from the group of aluminum, silica, boron, aluminum oxide, silicon carbide and boron carbide.

7. The method for making carbon/carbon composite disks according to claim 6, further comprising the step of heat curing said compressed mat.

* * * * *